（12) United States Patent
Hou et al.

(10) Patent No.: US 11,383,189 B2
(45) Date of Patent: Jul. 12, 2022

(54) PREPARATION METHOD OF COTTON BAST FIBER AND CHITOSAN COMPOSITE NON-WOVEN FABRIC FOR FILTRATION

(71) Applicant: Jiangnan University, Wuxi (CN)

(72) Inventors: Xiuliang Hou, Wuxi (CN); Dan Yang, Wuxi (CN); Bomou Ma, Wuxi (CN); Gangwei Pan, Wuxi (CN); Guowei Liu, Wuxi (CN)

(73) Assignee: Jiangnan University, Wuxi (CN)

( * ) Notice: Subject to any disclaimer, the term of this patent is extended or adjusted under 35 U.S.C. 154(b) by 649 days.

(21) Appl. No.: 16/368,468

(22) Filed: Mar. 28, 2019

(65) Prior Publication Data

US 2019/0217232 A1 Jul. 18, 2019

Related U.S. Application Data

(63) Continuation of application No. PCT/CN2017/104339, filed on Sep. 29, 2017.

(30) Foreign Application Priority Data

Sep. 26, 2017 (CN) .......................... 201710877706.X (51) Int. Cl.
*B01D 39/18* (2006.01)
*D21B 1/36* (2006.01)
(Continued)

(52) U.S. Cl.
CPC .............. *B01D 39/18* (2013.01); *D21B 1/36* (2013.01); *D21D 1/02* (2013.01); *D21D 1/40* (2013.01);
(Continued)

(58) Field of Classification Search
CPC combination set(s) only.
See application file for complete search history.

(56) References Cited

U.S. PATENT DOCUMENTS 5,769,934 A * 6/1998 Ha .......................... C08B 15/02
106/162.8
6,238,516 B1 * 5/2001 Watson .................. D21B 1/026
162/8

(Continued)

FOREIGN PATENT DOCUMENTS

CN 101265677 A 9/2008
CN 103015259 A 4/2013
(Continued)

*Primary Examiner* — Eric Hug
*Assistant Examiner* — Elisa H Vera
(74) *Attorney, Agent, or Firm* — IPRO, PLLC (57) ABSTRACT

The present invention discloses a preparation method of a cotton bast fiber and chitosan composite non-woven fabric for filtration and belongs to the technical field of fiber materials. The preparation method adopts steam flash explosion for pretreatment to separate cotton bast first, then a papermaking method is used for forming, finally chitosan is added to enhance the mechanical performance and improve the filtration efficiency, and a technological process is simple, environmentally friendly and suitable for industrial production. The non-woven fabric adopts lignin-rich cotton bast fibers and chitosan as raw materials, so that the non-woven fabric has good antibacterial performance. The cotton bast and chitosan used in the preparation method are both bio-based materials which can be degraded in the natural environment after use, so that burdens caused to the environment are reduced. At the same time, the problem that electrospinning methods are difficult to use in industrialized and mass production is avoided.

16 Claims, 11 Drawing Sheets

(51) Int. Cl.
*D21D 1/02* (2006.01)
*D21D 1/40* (2006.01)
*D21F 13/00* (2006.01)
*D21H 11/12* (2006.01)
*D21H 21/18* (2006.01)
*D21H 27/08* (2006.01)
*D21H 17/24* (2006.01)
*D21H 21/36* (2006.01)

(52) U.S. Cl.
CPC ............ *D21F 13/00* (2013.01); *D21H 11/12* (2013.01); *D21H 17/24* (2013.01); *D21H 21/18* (2013.01); *D21H 21/36* (2013.01); *D21H 27/08* (2013.01); *B01D 2239/0442* (2013.01); *B01D 2239/0618* (2013.01); *B01D 2239/10* (2013.01); *B01D 2239/1225* (2013.01); *B01D 2239/1233* (2013.01)

(56) References Cited

U.S. PATENT DOCUMENTS

| | | | | |
|---|---|---|---|---|
| 2008/0038975 | A1* | 2/2008 | Weiss | D04H 1/542 |
| | | | | 442/326 |
| 2011/0250816 | A1* | 10/2011 | Fujiwara | B32B 27/02 |
| | | | | 442/358 |
| 2013/0012689 | A1* | 1/2013 | Singh | B01D 15/125 |
| | | | | 530/388.1 |
| 2014/0170313 | A1* | 6/2014 | Jogikalmath | D21H 17/37 |
| | | | | 427/244 |
| 2015/0139977 | A1* | 5/2015 | Weiner | A23L 7/00 |
| | | | | 424/94.61 |
| 2016/0130412 | A1* | 5/2016 | Biesalski | C08J 5/045 |
| | | | | 523/220 |
| 2017/0016182 | A1 | 1/2017 | Mondala et al. | |
| 2018/0280561 | A1* | 10/2018 | Lin | A61P 17/00 |
| 2018/0287119 | A1* | 10/2018 | Igawa | H01M 50/44 |
| 2019/0242055 | A1* | 8/2019 | Salam | C09J 123/0853 |

FOREIGN PATENT DOCUMENTS

| | | |
|---|---|---|
| CN | 103882704 A | 6/2014 |
| CN | 104047062 A | 9/2014 |
| WO | 2007092450 A2 | 8/2007 |

\* cited by examiner

PREPARATION METHOD OF COTTON BAST FIBER AND CHITOSAN COMPOSITE NON-WOVEN FABRIC FOR FILTRATION

TECHNICAL FIELD

The disclosure herein relates to a preparation method of a cotton bast fiber and chitosan composite non-woven fabric for filtration and belongs to the technical field of fiber materials.

BACKGROUND

China is the world's largest cotton producer with the annual cotton yield accounting for about 30% of the world. The annual production of cotton bast is as high as 20 million tons, while the utilization rate of resources is only about 5%. The cotton bast can be processed into feed and fertilizer, used for production of ethyl alcohol and applied in textile, composite materials and other fields. However, for a long time, most of cotton straw is burned as waste, and waste of resources is caused.

At present, cotton bast fibers are mainly applied in the following aspects that (1), the cotton bast fibers are prepared through alkali treatment, for example, an invention patent, namely a method of directly degumming cotton stalks for preparing cotton bast cellulose fibers (CN102286789A), introduces a method for preparing the cotton bast fibers through alkali treatment; (2), the cotton bast fibers which can be applied to spinning and weaving and have the fineness of 27 dtex are extracted by means of a steam flash explosion-KOH—$H_2O_2$ combined using method; (3), the cotton bast is prepared into the fibers through flash explosion and then compounded with a thermoplastic material to prepare a composite sheet.

Application of the cotton bast fibers in the field of air filtration is a new breakthrough.

In the prior art, most materials such as cotton non-woven fabrics are adopted for filtering air particles, the filtration efficiency is improved by increasing the thickness and density of the materials, but cotton fiber resources are limited, and the cost is high; filtering materials prepared by using synthetic fibers such as PP as raw materials are low in cost and likely to breed bacteria. In order to improve the antibacterial performance, an antibacterial bacteriostatic filtering material using PP impregnated in a nano $TiO_2$ dispersion liquid is studied. A composite antibacterial nanofiber air filtering material is mainly prepared by electrospinning, and the filtering effect of the material is good, but the electrospinning process is complicated and not suitable for industrialized and mass production. Most of the raw materials used are petroleum-based chemical materials such as PP and are not easily degraded, and environmental pollution is caused after the materials are discarded.

Therefore, it is necessary to develop a novel technology to solve the existing problems.

SUMMARY

In order to solve the problems above, the present invention aims at providing a preparation method of a non-woven fabric for filtration. By combining steam flash explosion for several times, papermaking and hot pressing, the soft cotton bast/chitosan non-woven fabric suitable for filtration is prepared. The method adopts a steam explosion process test bench to separate the cotton bast into fibers; by means of a papermaking mode, the fibers are distributed uniformly in formed pad sheets and are isotropic; through addition of chitosan, the strength, antibacterial performance and filtration performance of the pad sheets are enhanced; through hot pressing, a finished product is thin and smooth in surface, and the pad sheets are more compact.

The preparation method of the cotton bast fiber and chitosan composite non-woven fabric for filtration includes the steps of beating the cotton bast fibers from which bulk impurities are removed, conducting papermaking to obtain sheets, soaking the sheets in a chitosan solution, conducting primary hot pressing to obtain fiber sheets, washing the fiber sheets with alkali solution, cleaning the fiber sheets and conducting secondary hot pressing to obtain the 滤液 cotton bast fiber and chitosan composite non-woven fabric.

In one embodiment, the method includes the processes of preparation of the cotton bast, cutting, soaking, steam flash explosion for several times, cleaning, beating, papermaking, soaking in the chitosan solution, primary hot pressing, washing with a NaOH solution, cleaning, secondary hot pressing and obtaining of the cotton bast fiber/chitosan composite non-woven fabric.

In one embodiment, preparation of the cotton bast fibers includes the steps of cutting the cotton bast into pieces with a certain length, soaking the pieces in water, conducting steam flash explosion for several times after soaking, washing the pieces with water and removing the bulk impurities to obtain the cotton bast fibers.

In one embodiment, steam flash explosion for several times includes the steps of loading the soaked cotton bast into a material bin of a flash explosion machine, introducing saturated water vapor to make the pressure of the saturated water vapor reach 1.5-2 MPa, conducting flash explosion after the pressure of the saturated water vapor is maintained for 40-80 seconds, repeating the flash explosion step and conducting explosion three times to five times.

In one embodiment, beating is conducted after defibering for a period of time when the mass concentration of the cotton bast is controlled to be 40-80%, the fineness of the obtained cotton bast fibers is controlled to be 25-50 dtex, and the length of the obtained fibers is 5-10 mm.

In one embodiment, papermaking includes the steps of weighing the dried cotton bast fibers after beating, using a defibering machine for defibering for 5-10 minutes and further adding water for papermaking to obtain the cotton bast fiber sheets.

In one embodiment, soaking in the chitosan solution is soaking in a chitosan-acetic acid solution with the chitosan concentration of 2.5-25 g/L.

In one embodiment, primary hot pressing is conducted under the pressure of 1-3 MPa at 100-110° C. for 5-10 minutes.

In one embodiment, washing with the alkali solution includes the steps of soaking and washing the dried fiber sheets prepared in the last step in a KOH or NaOH solution with the mass concentration of 0.05-0.5%.

In one embodiment, secondary hot pressing is conducted under the pressure of 1-3 MPa at 105-120° C. for 5-10 minutes.

In one embodiment, the method is specifically implemented according to the following steps:

(1) cutting, wherein the cotton bast is cut into fragments with the length of 1.0-3.0 cm;

(2) soaking, wherein the cut cotton bast is placed in clean water which is 15-30 times the mass of the cotton bast, and then soaked at the water temperature of 70-90° C. for 2-8 hours;

(3) flash explosion for several times, wherein the soaked cotton bast is loaded into the material bin of the flash explosion machine, the saturated water vapor is introduced to make the pressure of the saturated water vapor reach 1.5-2 MPa, flash explosion is conducted after the pressure of the saturated water vapor is maintained for 40-80 seconds, the flash explosion step is repeated, and explosion is conducted three times to five times;

(4) cleaning, wherein the cotton bast fibers after flash explosion are cleaned with water three times to five times at room temperature to remove the bulk impurities;

(5) beating, wherein a frequency-adjusting beater is used for beating, the concentration of slurry is controlled to be 60%, and after defibering for 5-10 minutes, beating is conducted separately for 10-25 minutes; the fineness of the obtained cotton bast fibers is controlled to be 25-50 dtex, and the length of the obtained fibers is 5-10 mm;

(6) papermaking, wherein the fibers dried to absolute dryness after beating are weighed separately, water is added, the defibering machine is used for defibering for 5-10 minutes, and water is added again for papermaking to obtain the sheets; 2 L of water is added into per 2-5 g of the absolutely dry fibers, and then water is supplemented until the whole volume is 10 L;

(7) soaking in the chitosan solution, wherein the cotton bast fiber sheets after papermaking are soaked in the chitosan-acetic acid solution with the concentration of 2.5-025 g/L, and excess liquid is scraped off, wherein the concentration of an acetic acid solution is 1 wt %;

(8) primary hot pressing, wherein the cleaned fiber sheets are placed in a flat hot press for hot pressing under the pressure of 1-3 MPa at 100-110° C. for 5-10 minutes to obtain the cotton bast/chitosan composite fiber sheets;

(9) washing with the NaOH solution, wherein the dried fiber sheets are placed in the 0.05-0.5% NaOH solution for soaking and washing;

(10) cleaning, wherein the fiber sheets are repeatedly cleaned with clean water to neutral;

(11) secondary hot pressing, wherein the cleaned nonwoven fabrics are placed in the flat hot press for hot pressing under the pressure of 1-3 MPa at 105-120° C. for 5-10 minutes to obtain the cotton bast fiber/chitosan composite non-woven fabric.

In the steps above:

1. By means of soaking, in the process of soaking the cotton bast, a large number of water molecules enter the cotton bast and impact the cotton bast in the form of high-pressure water vapor in the process of steam flash explosion, and therefore the cotton bast is helped to be quickly separated into the fibers;

2. The steam flash explosion can remove pectin, water soluble matters, hemicellulose and a part of lignin in the cotton bast, so that the cotton bast is separated. A method of flash explosion for several times makes full use of a physical process of the steam flash explosion to explode and separate the cotton bast through high-temperature and high-pressure water vapor injection. By increasing the flash explosion number, the effect of separating the cotton bast fibers can be improved under the condition of low saturated water vapor pressure, and damage caused by high temperature to the fibers is reduced to fully protect various properties of the separated cotton bast fibers;

3. The main function of cleaning is to remove small flake-like impurities adhered to the fibers after flash explosion;

4. The purpose of beating is to defiber and disperse the fibers, so that the fibers are thinner, shorter and suitable for the papermaking process;

5. Papermaking is conducted in order to uniformly spread the fibers into the sheets, and the fibers in the pad sheets are isotropic;

6. Addition of chitosan can utilize the film forming performance of chitosan to enhance the mechanical performance (especially wet strength), filtration performance and antibacterial performance of the pad sheets;

7. Hot pressing can make the finally formed pad sheets smooth in surface and thin and uniform in thickness, and a certain reinforcement effect is also achieved.

Advantages and Effects of the Invention

The cotton bast fiber/chitosan composite non-woven fabric prepared by the method has the advantages of being soft, good in antibacterial performance and filtration performance, cheap in preparation raw materials and simple in preparation process; the yield of the fabric with the aperture within 27 μm reaches 98.3%, and a good particle barrier property is achieved; the filtration efficiency is 94.50% when the particle size is greater than or equal to 0.5 μm, and the filtration efficiency is 99.55% when the particle size is greater than or equal to 1 μm.

Compared with conventional non-woven fabrics for electrospinning filtration, the preparation method adopts the steam flash explosion for pretreatment to separate the cotton bast first, then the papermaking method is used for forming, finally chitosan is added to enhance the mechanical performance and improve the filtration efficiency, and the technological process is simple, environmentally friendly and suitable for industrial production. The non-woven fabric adopts the lignin-rich cotton bast fibers and chitosan as the raw materials, so that the non-woven fabric has good antibacterial performance.

Compared with non-woven fabrics prepared by electrospinning polypropylene, polyacrylonitrile, polyester 5, polyester 6 and the like for filtration and filters prepared by carbon fibers for high-voltage filtration of PM1.0 particles in existing reports, the cotton bast and chitosan used in the preparation method are both bio-based materials which can be degraded in the natural environment after use, so that burdens caused to the environment are reduced; about 30% lignin contained in the cotton bast fibers and chitosan after flash explosion both have good antibacterial performance, and the problems of deposition of dust particles and breeding of bacteria in a warm and humid environment can be reduced or avoided during the use of a breathing filter.

The preparation method adopts the steam flash explosion for pretreatment, and under combination with the methods of papermaking and hot pressing, the cotton bast fiber and chitosan composite non-woven fabric is prepared, so that the problem that electrospinning methods are difficult to use in industrialized and mass production is avoided.

DETAILED DESCRIPTION

Aperture determination is conducted, wherein a CFP-1100A type capillary flow pore measuring instrument (American Stowell Co., Ltd.) is adopted;

measurement of the filtration efficiency is conducted, wherein an LZC-H type filtering material comprehensive performance test bench (Suzhou Huada Instrument Equipment Co., Ltd.) is adopted.

The preparation method is now further described in combination with the following specific examples.

The preparation method adopts the steam explosion process test bench for pretreatment of cotton bast first, so that the hemicellulose and lignin in the cotton bast are partially degraded, and the cotton bast is fully separated into the fibers; then the methods of beating and papermaking are used for preparing the cotton bast fibers into the uniform sheets, and a chitosan solution is added for reinforcement treatment; finally hot pressing for forming is conducted to obtain a cotton bast/chitosan composite non-woven fabric which is soft, smooth, flat and suitable for filtration.

Example 1

The preparation method includes the steps:

(1) cutting, wherein the cotton bast is cut into fragments with the length of 1.5 cm;

(2) soaking, wherein the cut cotton bast is placed in clean water with the bath ratio of 1:15 and then soaked at the water temperature of 80° C. for 2 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) beating, wherein a frequency-adjusting beater is used for beating, the concentration of the slurry is controlled to be 60%, and after defibering for 5 minutes, beating is conducted for 15 minutes;

(6) papermaking, wherein 4 g of the slurry dried to absolute dryness after beating are weighed separately, water is added to 2 L, a defibering machine is used for defibering for 10 minutes, water is added again until the whole volume is 10 L, and papermaking is conducted to obtain the sheets;

(7) soaking in the chitosan solution, wherein the pad sheets after papermaking are soaked in a 2.5 g/L chitosan-acid solution, and excess liquid is scraped off;

(8) primary hot pressing, wherein the treated wet pad sheets are placed in a flat hot press for hot pressing under the pressure of 1 MPa at 105° C. for 10 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 3 MPa at 120° C. for 10 minutes to obtain the cotton bast/chitosan composite non-woven fabric.

Figure 1:
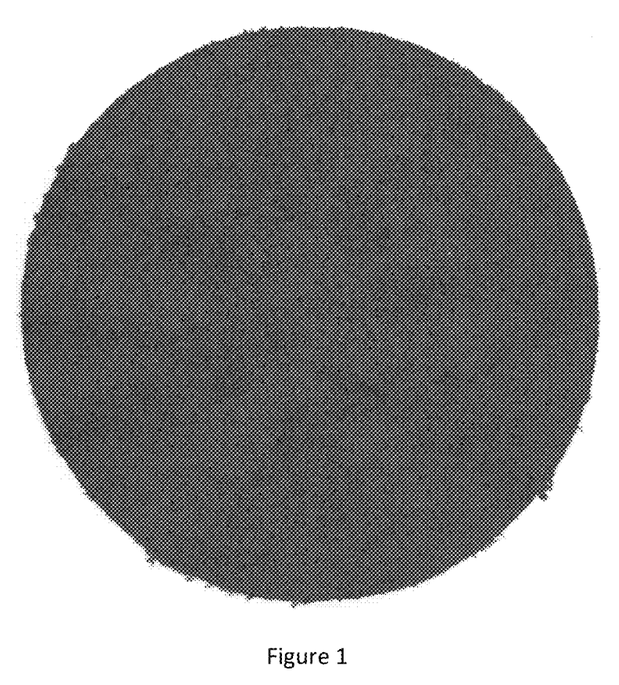
FIG. 1 is a picture showing a cotton bast fiber/chitosan composite non-woven fabric prepared in an example 1.
Figure 2:
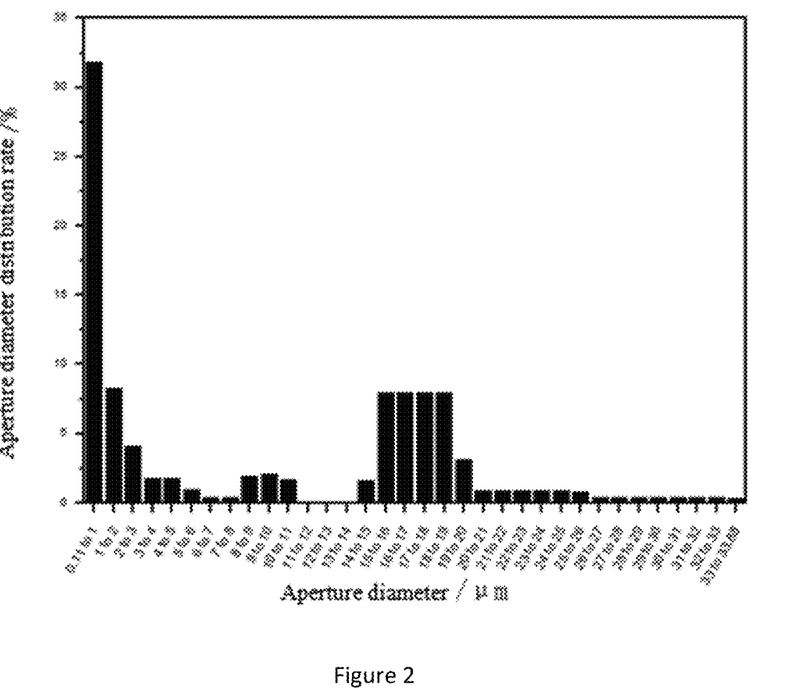
FIG. 2 is an aperture diameter distribution diagram of the cotton bast fiber/chitosan composite non-woven fabric prepared in the example 1.
Figure 3:
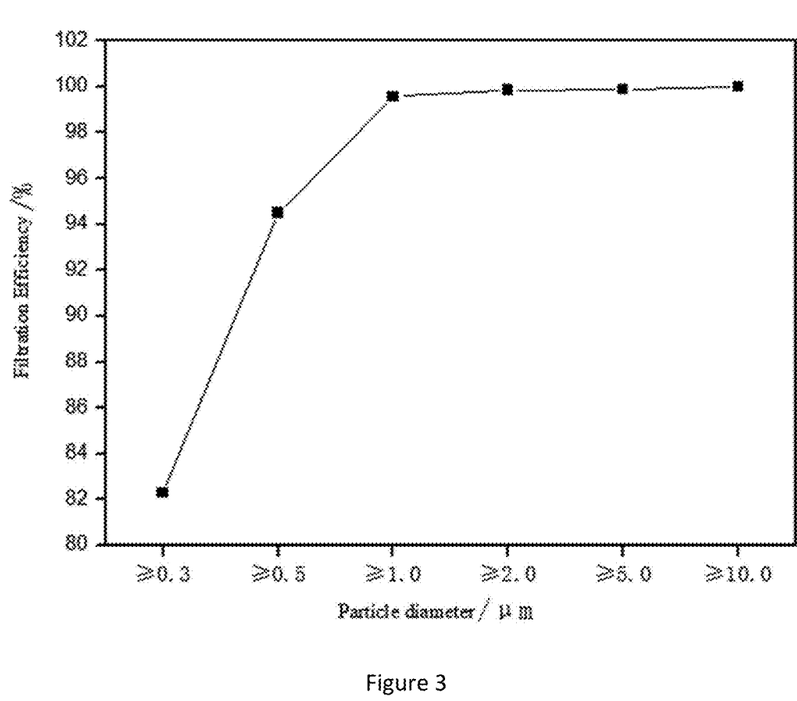
FIG. 3 is a diagram showing the filtration efficiency of the cotton bast fiber/chitosan composite non-woven fabric prepared in the example 1.

The picture, aperture distribution and filtration effect of the obtained composite non-woven fabric are shown as the following FIG. 1, FIG. 2 and FIG. 3 respectively. As shown in the FIGS. 2-3, the yield of the non-woven fabric, with the aperture within 27 μm, prepared in the example reaches 98.3%, and a good particle barrier property is achieved; the filtration efficiency is 94.50% or above when the particle size is greater than or equal to 0.5 μm, and the filtration efficiency is 99.55% or above when the particle size is greater than or equal to 1 μm.

Figure 4:
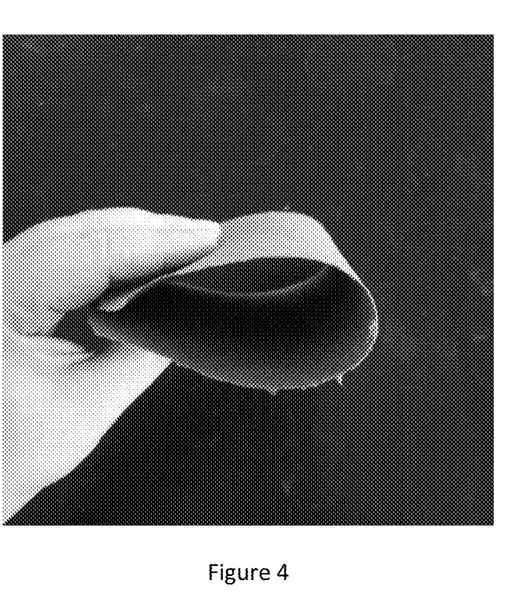
FIG. 4 is a picture showing a softness test of the cotton bast fiber/chitosan composite non-woven fabric prepared in the example 1.

In addition, as shown in the FIG. 4, the prepared cotton bast/chitosan composite non-woven fabric has good softness performance.

Example 2

(1) cutting, wherein the cotton bast is cut into fragments with the length of 2 cm;

(2) soaking, wherein the cut cotton bast is placed in clean water with the bath ratio of 1:20 and then soaked at the water temperature of 75° C. for 3 hours;

(3) flash explosion for several times, wherein the soaked cotton bast is loaded into a material bin of a flash explosion machine, saturated water vapor is introduced to make the pressure of the saturated water vapor reach 1.5 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) beating, wherein a frequency-adjusting beater is used for beating, the concentration of the slurry is controlled to be 60%, and after defibering for 5 minutes, beating is conducted for 20 minutes;

(6) papermaking, wherein 5 g of the slurry dried to absolute dryness after beating are weighed separately, water is added to 2 L, a defibering machine is used for defibering for 10 minutes, water is added again until the whole volume is 10 L, and papermaking is conducted to obtain the sheets;

(7) soaking in the chitosan solution, wherein the pad sheets after papermaking are soaked in a 2.5 g/L chitosan-acid solution, and excess liquid is scraped off;

(8) primary hot pressing, wherein the treated wet pad sheets are placed in a flat hot press for hot pressing under the pressure of 2 MPa at 105° C. for 5 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 3 MPa at 120° C. for 10 minutes to obtain the cotton bast/chitosan composite non-woven fabric.

Figure 5:
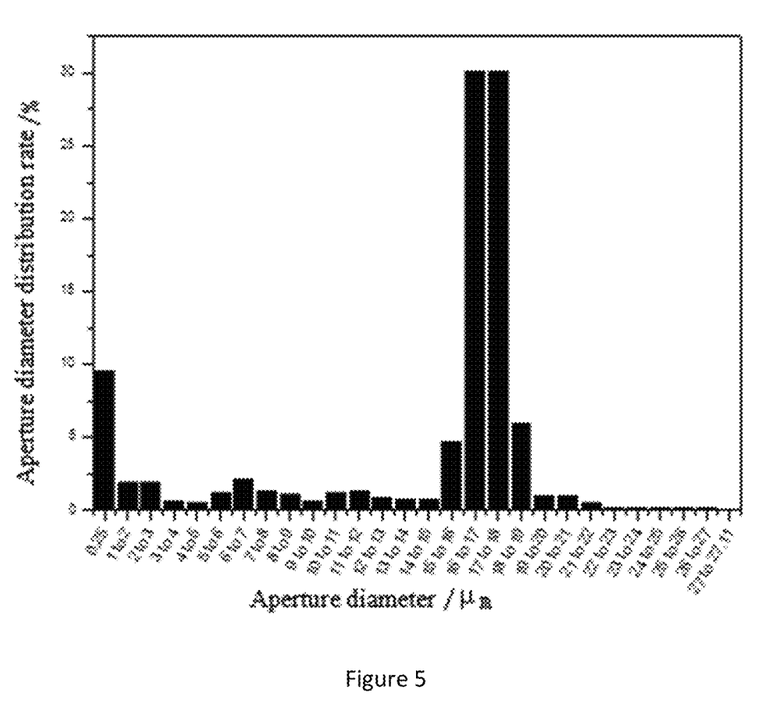
FIG. 5 is an aperture diameter distribution diagram of a cotton bast fiber/chitosan composite non-woven fabric prepared in an example 2.
Figure 6:
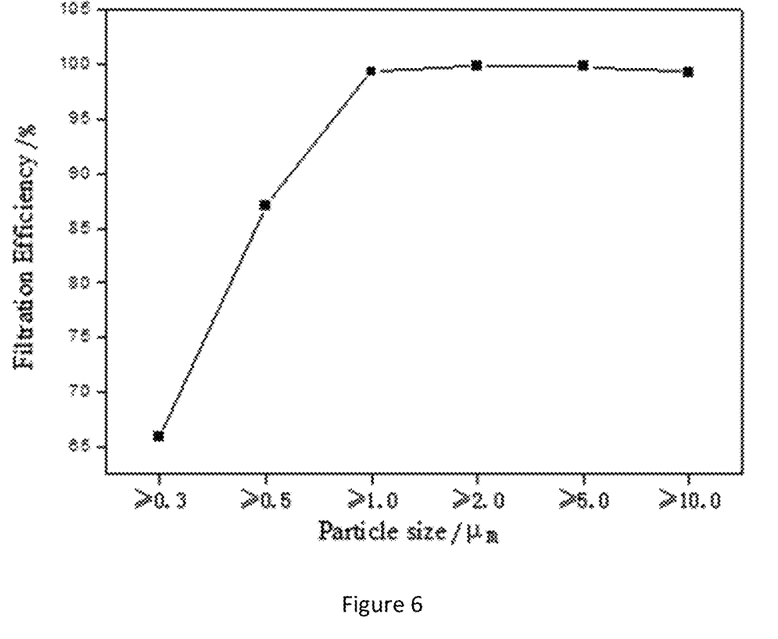
FIG. 6 is a diagram showing the filtration efficiency of the cotton bast fiber/chitosan composite non-woven fabric prepared in the example 2.
Figure 7:
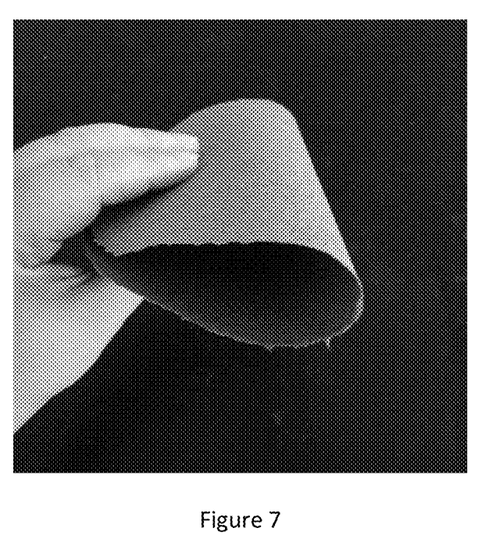
FIG. 7 is a picture showing a softness test of the cotton bast fiber/chitosan composite non-woven fabric prepared in the example 2.

The aperture distribution, filtration effect and softness performance of the non-woven fabric obtained according to the method in the example are shown as the following FIG. 5, FIG. 6 and FIG. 7 respectively. Results show that the yield of the non-woven fabric, with the aperture within 27 μm, prepared by the method in the example reaches 98% or above, and a good particle barrier property is achieved; the filtration efficiency is 87% or above when the particle size is greater than or equal to 0.5 μm, and the filtration efficiency is 98% or above when the particle size is greater than or equal to 1 μm; the softness is good.

Example 3

(1) cutting, wherein the cotton bast is cut into fragments with the length of 2 cm;

(2) soaking, wherein the cut cotton bast is placed in clean water with the bath ratio of 1:30 and then soaked at the water temperature of 70° C. for 2 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) beating, wherein a frequency-adjusting beater is used for beating, the concentration of the slurry is controlled to be 60%, and after defibering for 5 minutes, beating is conducted for 10 minutes;

(6) papermaking, wherein 2 g of the slurry dried to absolute dryness after beating are weighed separately, water is added to 2 L, a defibering machine is used for defibering for 10 minutes, water is added again until the whole volume is 10 L, and papermaking is conducted to obtain the sheets;

(7) soaking in the chitosan solution, wherein the pad sheets after papermaking are soaked in a 15 g/L chitosan-acid solution, and excess liquid is scraped off;

(8) primary hot pressing, wherein the treated wet pad sheets are placed in a flat hot press for hot pressing under the pressure of 1 MPa at 100° C. for 10 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 5 tons at 120° C. for 10 minutes to obtain the cotton bast/chitosan composite non-woven fabric.

Figure 8:
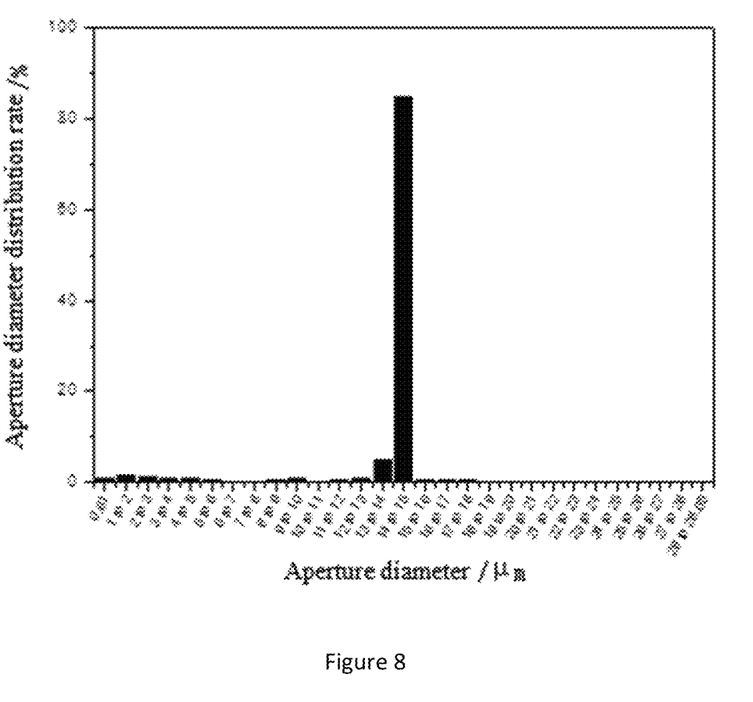
FIG. 8 is an aperture diameter distribution diagram of a cotton bast fiber/chitosan composite non-woven fabric prepared in an example 3.
Figure 9:
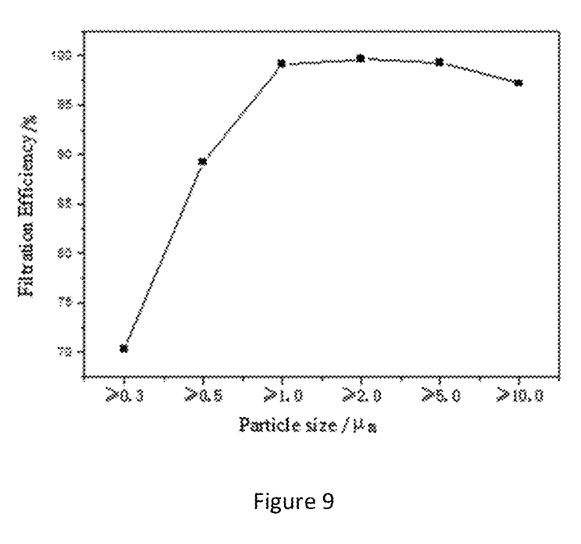
FIG. 9 is a diagram showing the filtration efficiency of the cotton bast fiber/chitosan composite non-woven fabric prepared in the example 3.
Figure 10:
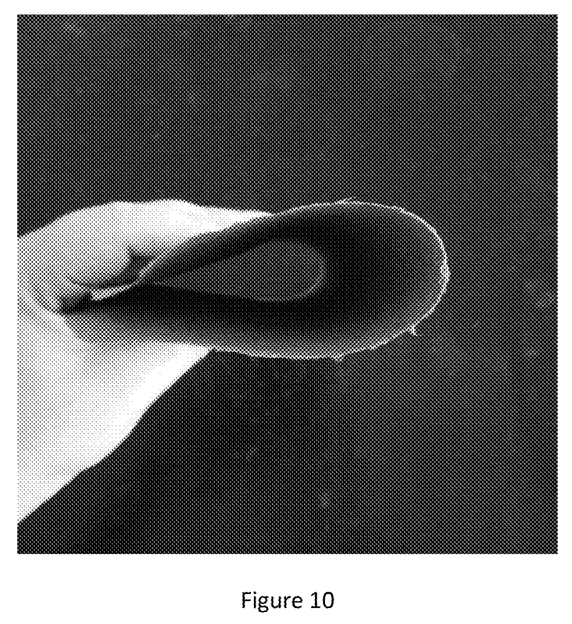
FIG. 10 is a picture showing a softness test of the cotton bast fiber/chitosan composite non-woven fabric prepared in the example 3.

The aperture distribution, filtration effect and softness performance of the non-woven fabric obtained according to the method in the example are shown as the following FIG. 8, FIG. 9 and FIG. 10 respectively. Results show that the yield of the non-woven fabric, with the aperture of 13-15 μm, prepared by the method in the example is about 90%, and a good particle barrier property is achieved; the filtration efficiency is 89% or above when the particle size is greater than or equal to 0.5 μm, and the filtration efficiency is 98% or above when the particle size is greater than or equal to 1 μm; the softness is good.

Example 4

(1) cutting, wherein the cotton bast is cut into fragments with the length of 1 cm;

(2) soaking, wherein the cut cotton bast is placed in clean water with the bath ratio of 1:20 and then soaked at the water temperature of 70° C. for 4 hours;

(3) flash explosion for several times, wherein the soaked cotton bast is loaded into a material bin of a flash explosion machine, saturated water vapor is introduced to make the pressure of the saturated water vapor reach 1.5 MPa, flash explosion is conducted after the pressure of the saturated water vapor is maintained for 80 seconds, the flash explosion step is repeated, and explosion is conducted five times;

(4) cleaning, wherein the cotton bast fibers after flash explosion are cleaned four times at room temperature to remove bulk impurities;

(5) beating, wherein a frequency-adjusting beater is used for beating, the concentration of the slurry is controlled to be 40%, and after defibering for 6 minutes, beating is conducted for 10 minutes;

(6) papermaking, wherein 2 g of the slurry dried to absolute dryness after beating are weighed separately, water is added to 2 L, a defibering machine is used for defibering for 5 minutes, water is added again until the whole volume is 10 L, and papermaking is conducted to obtain the sheets;

(7) soaking in the chitosan solution, wherein the pad sheets after papermaking are soaked in a 2.5 g/L chitosan-acid solution, and excess liquid is scraped off;

(8) primary hot pressing, wherein the treated wet pad sheets are placed in a flat hot press for hot pressing under the pressure of 2 MPa at 100° C. for 5 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 1 MPa at 105° C. for 8 minutes to obtain the cotton bast/chitosan composite non-woven fabric.

The yield of the non-woven fabric, with the aperture within 27 μm, prepared by the method in the example reaches 97%, the filtration efficiency is 85% or above when the particle size is greater than or equal to 0.5 μm, and the filtration efficiency is 98% or above when the particle size is greater than or equal to 1 μm.

Example 5

(1) cutting, wherein the cotton bast is cut into fragments with the length of 3 cm;

(2) soaking, wherein the cut cotton bast is placed in clean water with the bath ratio of 1:30 and then soaked at the water temperature of 90° C. for 2.5 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 70 seconds, the flash explosion step is repeated, and explosion is conducted four times;

(4) cleaning, wherein the cotton bast fibers after flash explosion are cleaned three times at room temperature to remove bulk impurities;

(5) beating, wherein a frequency-adjusting beater is used for beating, the concentration of the slurry is controlled to be 80%, and after defibering for 10 minutes, beating is conducted for 25 minutes;

(6) papermaking, wherein 5 g of the slurry dried to absolute dryness after beating are weighed separately, water is added to 4 L, a defibering machine is used for defibering for 10 minutes, water is added again until the whole volume is 10 L, and papermaking is conducted to obtain the sheets;

(7) soaking in the chitosan solution, wherein the pad sheets after papermaking are soaked in a 25 g/L chitosan-acid solution, and excess liquid is scraped off;

(8) primary hot pressing, wherein the treated wet pad sheets are placed in a flat hot press for hot pressing under the pressure of 3 MPa at 110° C. for 10 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 3 MPa at 120° C. for 10 minutes to obtain the cotton bast/chitosan composite non-woven fabric.

The yield of the non-woven fabric, with the aperture within 27 μm, prepared by the method in the example reaches 97% or above, a good particle barrier property is achieved, the filtration efficiency is 92% or above when the particle size is greater than or equal to 0.5 μm, and the filtration efficiency is 99.2% or above when the particle size is greater than or equal to 1 μm.

Comparative Example 1

Compared with the example 1, the step of soaking in the chitosan solution is omitted, specifically:

(1) cutting, wherein the cotton bast is cut into fragments with the length of 1.5 cm;

(2) soaking, wherein the cut cotton bast is placed in clean water with the bath ratio of 1:15 and then soaked at the water temperature of 80° C. for 2 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) beating, wherein a frequency-adjusting beater is used for beating, the concentration of the slurry is controlled to be 60%, and after defibering for 5 minutes, beating is conducted for 15 minutes;

(6) papermaking, wherein 4 g of the slurry dried to absolute dryness after beating are weighed separately, water is added to 2 L, a defibering machine is used for defibering for 10 minutes, water is added again until the whole volume is 10 L, and papermaking is conducted to obtain the sheets;

(7) hot pressing, wherein the cleaned pad sheets are placed in the flat hot press for hot pressing under the pressure of 3 MPa at 120° C. for 10 minutes to obtain the cotton bast/chitosan composite non-woven fabric.

the cotton bast non-woven fabric obtained in the above experiment is low in wet strength, cannot be subjected to steps such as soaking in a NaOH solution or water washing and aperture and filtration efficiency tests, and is not suitable for use.

Comparative Example 2

Compared with the example 1, the step of papermaking is omitted, and the sheets are manually laid in a funnel, specifically:

(1) cutting, wherein the cotton bast is cut into fragments with the length of 1.5 cm;

(2) soaking, wherein the cut cotton bast is placed in clean water with the bath ratio of 1:15 and then soaked at the water temperature of 80° C. for 2 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) beating, wherein a frequency-adjusting beater is used for beating, the concentration of the slurry is controlled to be 60%, and after defibering for 5 minutes, beating is conducted for 15 minutes;

(6) manual laying of the sheets, wherein 4 g of the slurry dried to the absolute dryness after beating is weighed separately and added into water for stirring uniformly to obtain a solution, the solution is poured into the funnel and stirred uniformly, and the cotton bast sheets are taken out after water is completely filtered out;

(7) soaking in the chitosan solution, wherein taken-out pad sheets are soaked in the 2.5 g/L chitosan-acid solution after being dried, and excess liquid is scraped off;

(8) primary hot pressing, wherein the treated wet pad sheets are placed in a flat hot press for hot pressing under the pressure of 1 MPa at 105° C. for 10 minutes;

(9) washing with NaOH solution, wherein the dried pad sheets are placed in the 0.5% NaOH solution for soaking and washing;

(10) cleaning, wherein NaOH remaining on the pad sheets are cleaned with clean water until the pad sheets are neutral;

(11) secondary hot pressing, wherein the cleaned pad sheets are placed in the flat hot press for hot pressing under the pressure of 3 MPa at 120° C. for 10 minutes to obtain the cotton bast/chitosan composite non-woven fabric.

Figure 11:
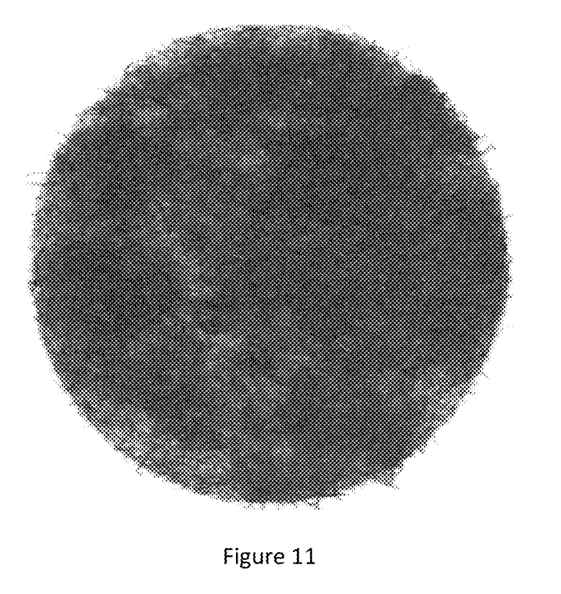
FIG. 11 is an apparent picture of a cotton bast non-woven fabric prepared in a comparative example 2.

The cotton bast non-woven fabric shown as the FIG. 11 and obtained in the above experiment is obviously uneven in thickness, and there are visible holes so that the aperture and filtration efficiency tests cannot be performed, and the cotton bast non-woven fabric is not suitable for use.

Comparative Example 3

Compared with the example 1, the step of beating is omitted, specifically:

(1) cutting, wherein the cotton bast is cut into fragments with the length of 1.5 cm;

(2) soaking, wherein the cut cotton bast is placed in clean water with the bath ratio of 1:15 and then soaked at the water temperature of 80° C. for 2 hours;

(3) flash explosion for several times, wherein the soaked cotton bast is loaded into a material bin of a flash explosion machine, saturated water vapor is introduced to make the pressure of the saturated water vapor reach 2 MPa, flash explosion is conducted after the pressure of the saturated water vapor is maintained for 60 seconds, the flash explosion step is repeated, and explosion is conducted three times;

(4) cleaning, wherein the cotton bast fibers after flash explosion are cleaned five times at room temperature to remove bulk impurities;

(5) papermaking, wherein 4 g of the slurry dried to absolute dryness after cleaning is weighed separately, water is added to 2 L, then the defibering machine is used for defibering for 10 minutes, water is added again until the whole volume is 10 L, and papermaking is conducted to obtain the sheets;

(6) soaking in the chitosan solution, wherein the pad sheets after papermaking are soaked in a 2.5 g/L chitosan-acid solution, and excess liquid is scraped off;

(7) primary hot pressing, wherein the treated wet pad sheets are placed in a flat hot press for hot pressing under the pressure of 1 MPa at 105° C. for 10 minutes;

(8) washing with NaOH solution, wherein the dried pad sheets are placed in the 0.5% NaOH solution for soaking and washing;

(9) cleaning, wherein NaOH remaining on the pad sheets are cleaned with clean water until the pad sheets are neutral;

(10) secondary hot pressing, wherein the cleaned pad sheets are placed in the flat hot press for hot pressing under the pressure of 3 MPa at 120° C. for 10 minutes to obtain the cotton bast/chitosan composite non-woven fabric.

the cotton bast non-woven fabric obtained in the above experiment has coarser fibers, adhesion between the fibers is serious, poor fiber dispersion makes the thickness uneven, there are visible pores in the cotton bast non-woven fabric, the aperture and filtration efficiency tests cannot be performed, and the cotton bast non-woven fabric is not suitable for use.

What is claimed is:

1. A non-woven fabric for filtration comprised of cotton bast fibers, wherein preparation of the non-woven fabric comprises:
providing cotton bast fibers,
cutting cotton bast fibers into fragments having a length of 1.0 cm to 3.0 cm,
soaking the fragments of cotton bast fibers in water at 70° C. to 90° C. for 2 to 8 hours,
steam flash exploding the fragments of cotton bast fibers at least three times,
cleaning the cotton bast fibers,
beating the cotton bast fibers,
conducting papermaking to obtain sheets,
soaking the sheets in a chitosan solution,
hot pressing the sheets at a pressure of 1 MPa to 3 MPa and a temperature of 100° C. to 110° C. for 5 to 10 minutes to obtain fiber sheets,
washing the fiber sheets with alkali solution,
cleaning the fiber sheets, and
hot pressing the fiber sheets a pressure of 1 MPa to 3 MPa and at a temperature of 105° C. to 120° C. for 5 to 10 minutes to obtain a cotton bast fiber and chitosan composite non-woven fabric.

2. The non-woven fabric for filtration according to claim 1, wherein the chitosan solution comprises chitosan at a concentration of 2.5 g/L to 25 g/L.

3. The non-woven fabric for filtration according to claim 1, wherein the steam flash exploding comprises:
loading cotton bast after soaking into a material bin of a flash explosion machine,
introducing saturated water vapor into the machine to make the pressure of the saturated water vapor reach 1.5 MPa to 2 MPa,
steam flash exploding the cotton bast fibers after the pressure of the saturated water vapor is maintained for 40 to 80 seconds, and
repeating the steam flash exploding step three times to five times.

4. The non-woven fabric for filtration according to claim 1, wherein the beating occurs after defibering for a period of time when the mass concentration of the cotton bast is controlled to be 40% to 80%, the fineness of the obtained cotton bast fibers is controlled to be 25 dtex to 50 dtex, and the length of the obtained fibers is 5 mm to 10 mm.

5. The non-woven fabric for filtration according to claim 1, wherein the papermaking comprises:
weighing the dried cotton bast fibers after beating, defibering for 5 to 10 minutes, and
adding water prior to papermaking.

6. The non-woven fabric for filtration according to claim 1, wherein washing with the alkali solution comprises:
soaking and washing the fiber sheets in a KOH or NaOH solution with a mass concentration of 0.05% to 0.5%.

7. A filtration device comprising the non-woven fabric for filtration according to claim 1.

8. The non-woven fabric for filtration of claim 1, wherein the non-woven fabric has a filtration efficiency for particles of greater than or equal to 0.5 μm of 94.50% and a filtration efficiency for particles of greater than or equal to 1.0 μm of 99.55%.

9. A method for preparing non-woven fabric for filtration, comprising:
providing cotton bast fibers,
cutting cotton bast fibers into fragments having a length of 1.0 cm to 3.0 cm,
soaking the fragments of cotton bast fibers in water at 70° C. to 90° C. for 2 to 8 hours,
steam flash exploding the fragments of cotton bast fibers at least three times,
cleaning the cotton bast fibers,
beating the cotton bast fibers,
conducting papermaking to obtain sheets,
soaking the sheets in a chitosan solution,
hot pressing the sheets a pressure of 1 MPa to 3 MPa and a temperature of 100° C. to 110° C. for 5 to 10 minutes to obtain fiber sheets,
washing the fiber sheets with alkali solution,
cleaning the fiber sheets, and
hot pressing the fiber sheets a pressure of 1 MPa to 3 MPa and at a temperature of 105° C. to 120° C. for 5 to 10 minutes to obtain a cotton bast fiber and chitosan composite non-woven fabric.

10. The method of claim 9, wherein the chitosan solution comprises chitosan at a concentration of 2.5 g/L to 25 g/L.

11. The method of claim 9, wherein the steam flash exploding comprises:
loading cotton bast after soaking into a material bin of a flash explosion machine,
introducing saturated water vapor into the machine to make the pressure of the saturated water vapor reach 1.5 MPa to 2 MPa,
steam flash exploding the cotton bast fibers after the pressure of the saturated water vapor is maintained for 40 to 80 seconds, and
repeating the steam flash exploding step three times to five times.

12. The method of claim 9, wherein the beating occurs after defibering for a period of time when the mass concentration of the cotton bast is controlled to be 40% to 80%, the fineness of the obtained cotton bast fibers is controlled to be 25 dtex to 50 dtex, and the length of the obtained fibers is 5 mm to 10 mm.

13. The method of claim 9, wherein the papermaking comprises:
weighing the dried cotton bast fibers after beating,
defibering for 5 to 10 minutes, and
adding water prior to papermaking.

14. The method of claim 9, wherein washing with the alkali solution comprises:
soaking and washing the fiber sheets in a KOH or NaOH solution with a mass concentration of 0.05% to 0.5%.

15. An air filtration device comprising pads or sheets comprised of non-woven fabric, wherein the non-woven fabric is prepared by:
providing cotton bast fibers,
cutting cotton bast fibers into fragments having a length of 1.0 cm to 3.0 cm,
soaking the fragments of cotton bast fibers in water at 70° C. to 90° C. for 2 to 8 hours,
steam flash exploding the fragments of cotton bast fibers at least three times,
cleaning the cotton bast fibers,
beating the cotton bast fibers,
conducting papermaking to obtain sheets,
soaking the sheets in a chitosan solution,
hot pressing the sheets a pressure of 1 MPa to 3 MPa and a temperature of 100° C. to 110° C. for 5 to 10 minutes to obtain fiber sheets,
washing the fiber sheets with alkali solution,
cleaning the fiber sheets, and
hot pressing the fiber sheets a pressure of 1 MPa to 3 MPa and at a temperature of 105° C. to 120° C. for 5 to 10 minutes to obtain a cotton bast fiber and chitosan composite non-woven fabric.

16. The air filtration device of claim 15, wherein the pads or sheets of non-woven fabric comprise a filtration efficiency for particles of greater than or equal to 0.5 μm of 94.50% and a filtration efficiency for particles of greater than or equal to 1.0 μm of 99.55%.

\* \* \* \* \*